No. 793,916. PATENTED JULY 4, 1905.
R. S. BRYANT.
VEHICLE WHEEL.
APPLICATION FILED NOV. 7, 1904.
2 SHEETS—SHEET 1.
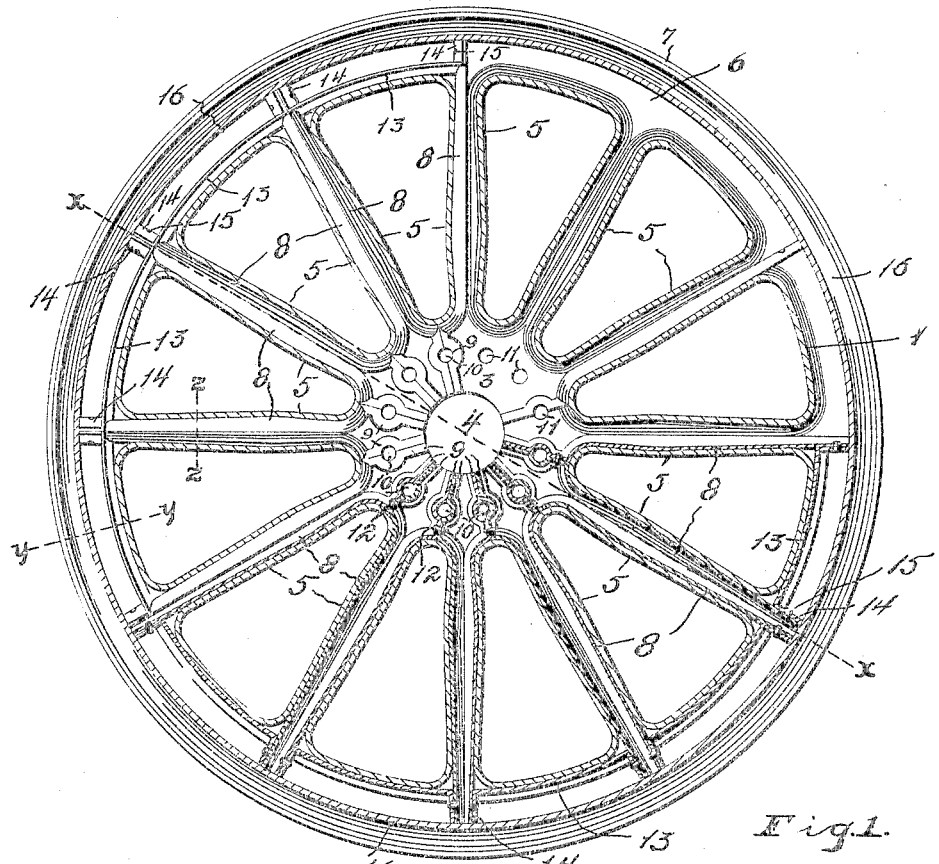
Fig.1.
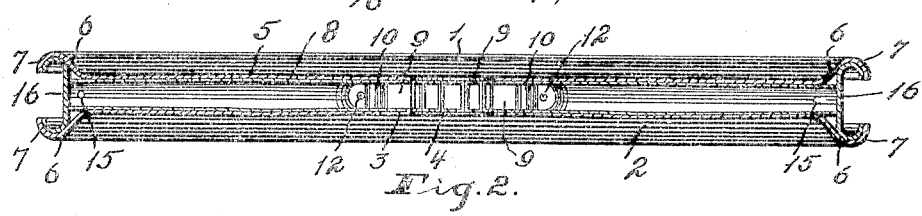
Fig.2.
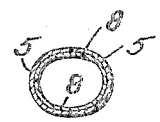
Fig.4.
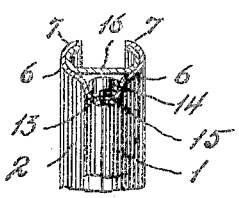
Fig.3.
WITNESSES:
C. Stoughton.
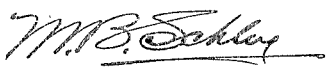
INVENTOR
Richard S. Bryant.
BY
ATTORNEYS No. 793,916. PATENTED JULY 4, 1905.
R. S. BRYANT.
VEHICLE WHEEL.
APPLICATION FILED NOV. 7, 1904.

2 SHEETS—SHEET 2.

WITNESSES:
C. Stoughton.

INVENTOR
Richard S. Bryant,

BY
ATTORNEYS

No. 793,916.

Patented July 4, 1905.

UNITED STATES PATENT OFFICE.

RICHARD S. BRYANT, OF COLUMBUS, OHIO, ASSIGNOR TO THE BRYANT STEEL WHEEL & RIM COMPANY, OF COLUMBUS, OHIO, A CORPORATION OF OHIO.

VEHICLE-WHEEL.

SPECIFICATION forming part of Letters Patent No. 793,916, dated July 4, 1905.

Application filed November 7, 1904. Serial No. 231,712.

*To all whom it may concern:*

Be it known that I, RICHARD S. BRYANT, a citizen of the United States, residing at Columbus, in the county of Franklin and State of Ohio, have invented a certain new and useful Improvement in Vehicle-Wheels, of which the following is a specification.

This invention relates to a new and useful improvement in vehicle-wheels.

The object of the invention is to provide an improved sectional or built-up wheel structure which while useful in many applications is particularly adapted for use in connection with pneumatic and cushion tires and for application to motor-vehicles.

It is, furthermore, designed to produce the wheel from sheet metal which is stamped, cut, or otherwise formed into the several sections of the wheels and the coöperating sections brazed, so as to convert them into an integral body which will produce a strong, durable, and efficient wheel construction.

With the above and other objects in view the invention consists of the novel details of construction and operation, a preferable embodiment of which is described in the specification and illustrated in the accompanying drawings, wherein—

Figure 5:
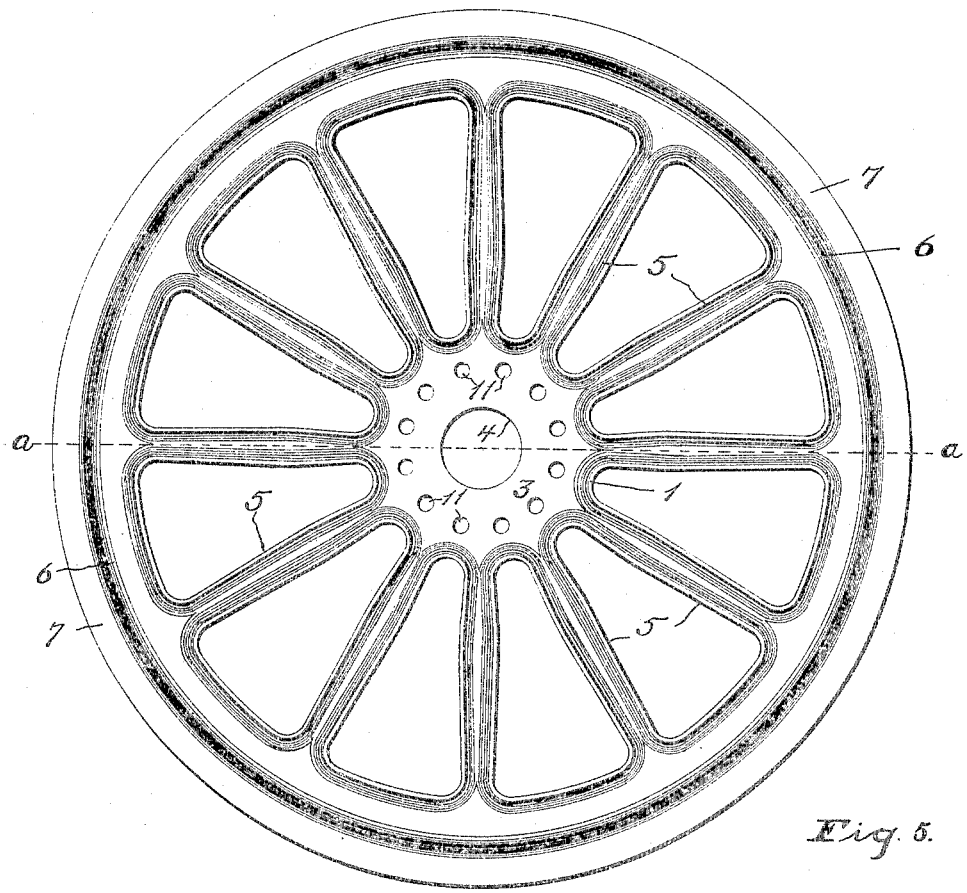
Figure 6:
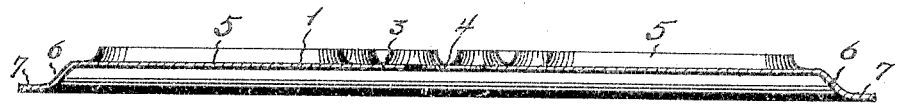

Figure 1 is a vertical sectional view of the wheel, showing some of the parts in elevation. Fig. 2 is a cross-sectional view of the wheel, taken on the line $x$ $x$ of Fig. 1. Fig. 3 is a detail cross-sectional view taken on the line $y$ $y$ of Fig. 1. Fig. 4 is a transverse vertical sectional view through one of the spokes, taken on the line $z$ $z$ of Fig. 1. Fig. 5 is an inner face view of one of the half-sections; and Fig. 6 is a cross-sectional view of the half-section, taken on the line $a$ $a$ of Fig. 5.

This invention is an improvement over my former patent, No. 734,254, issued July 21, 1903.

As herein set forth, it is an important feature of this invention to form the wheel of sheet metal, and in carrying out this object the wheel comprises duplicate half-sections 1 and 2, respectively, and therefore a description of one section will suffice for both sections. Each section has a flat central portion 3, provided with a central circular opening 4 for the reception of any suitable or preferred type of hub, (not shown, as the hub feature forms no part of the present invention.) From the central portion 3 the spoke-casing members 5 radiate, said spokes being pressed, stamped, or otherwise formed into semicircular or semielliptical shape, as best indicated in Fig. 4 of the drawings, with the convex faces of the spokes at the outer side of the wheel-section. The outer ends of the said spoke members are connected by an integral rim portion, which is bowed or bulged outwardly at 6. From this bowed portion extends an annular flange 7, which after the two sections of the wheel have been united is bent inward to form in cross-section with the portion 6 a semi-elliptical socket, as clearly set forth at 6 and 7 in Fig. 2. As shown in Figs. 2 and 3 of the drawings, it will be noted that the rim portion 6 is disposed at the outer side of the plane of the central portion of the wheel-section and the spokes are disposed at the opposite or inner side of the section, so that when the opposite wheel-sections are brought together, with the edges of the corresponding spoke members in mutual engagement, the free edges of the bowed rim portions 6 are separated by an annular interspace. Prior to bringing the opposite wheel-sections together inner semitubular sheet-metal spoke members 8 are fitted snugly in the spoke members 5 of one of the wheel-sections. The inner spoke members taper outwardly and are arranged two in each of the spoke-sections 5 in such a manner as to have their meeting edges lying in the centers of the concaved portions of the spokes 5 when the wheel-sections are brought together, thus breaking joints with each other, as clearly set forth in Fig. 4. From this it will be apparent that continuous openings or lines of intersection extending entirely through the spoke members 5 and 8 are avoided, thereby greatly strengthening the structure, which becomes, in fact, a single integral member when the wheel is brazed, as hereinafter set forth. Each spoke member 8 is formed at its inner end with a curved offset flanged member or portion 9, which has a flat face and is formed intermediate its ends with a semicircular depression or recess 10. The offset portions 9 of each of the half-spoke members 8 converge toward each other, as shown in Fig. 1, and register with the half-spoke member disposed in the spoke-member casing 5 on each side thereof. The portions 9 having their faces in engagement cylindrical openings are produced by the semicircular recesses 10. These openings register with apertures 11, formed in the central portions 3 of the wheel-sections, through which suitable bolts may be passed. The portions 10 are secured together by rivets 12, passed therethrough and upset on either side. The outer ends of the half-spoke members 8 extend beyond the spoke members 5, and the half members 8 of each adjacent spoke are connected by means of concaved semielliptical stretcher-pieces 13, which are formed with upwardly-bent concaved ends 14. The concaved ends 14 fit snugly against the extended ends of the half-spoke members 8 and are rigidly secured thereto by rivets 15. It will thus be seen that the spoke members 8 are rigidly secured together, and by observing Fig. 1 it will be apparent that a wheel within a wheel is formed, which when secured together produces a strong and substantial structure.

Between the rim portions 6 of the wheel is disposed a substantially U-shaped circumferential rim member 16, snugly fitted, so as to bridge the interval between the rim portions 6 and resting upon the outer ends of the half-spoke members 8. The rim member 16 is held in place by the annular flange 7, which is curved or bent inward to impinge the said member, as shown in Figs. 2 and 3, after the wheel-sections have been placed together and the rim member 16 inserted in position. By this construction the rim portions 5 are reinforced and greatly stiffened and strengthened, and a strong and substantial socket for the tire (not shown) is provided.

All the meeting edges of the opposite wheel-sections and parts are brazed, so as to form a strong, rigid, durable, and water-tight joint between the parts, and thereby to obviate the employment of separate fastenings, which are liable to break and work loose, and thus render the wheel weak and unserviceable.

I do not wish to limit myself to the exact details of construction herein set forth, as I may make various changes in the same without departing from the spirit of my invention.

Having now fully described my invention, what I claim, and desire to secure by Letters Patent, is—

1. A wheel composed of opposite half-sections each section being formed of sheet metal and provided with semitubular spokes and a semitubular rim-section, inner spoke members arranged in each section the spoke members of one section being united to the spoke members of the other section, means for connecting the outer ends of the spoke members with each other, and a supplemental rim member resting upon the outer ends of the spoke members and held rigidly in position by the semitubular rim portions of the sections.

2. A wheel comprising opposite half-sections having semitubular spoke members and inner tubular spoke members fitted within the outer spoke members and projected through the inner ends thereof, the inner projected end portions of adjacent inner spoke members lying in mutual contact, each of said members having depressions adapted to register with each other and form bolt-receiving openings, and means for securing the said members together.

3. A wheel comprising opposite sections having semitubular spoke members, inner tubular spoke members, fitted within the outer spoke members and projecting therefrom, and stretcher-pieces extending between and connected to the projecting end portions of the adjacent inner spoke members.

4. A wheel comprising opposite sections having semitubular spoke members which are open at opposite ends, inner tubular spoke members fitted within the outer spoke members and projecting beyond the inner and outer ends thereof, the inner projecting ends of the inner adjacent spoke members lying in mutual contact, said ends being formed with recesses to form openings, stretcher-pieces for connecting and bracing the outer projecting ends of the adjacent spoke members, and a circumferential rim member resting upon and closing the projecting outer ends of the inner spokes.

5. A wheel comprising opposite sections having semitubular spoke members which are open at opposite ends, inner tubular spoke members fitted within the outer spoke members and projecting beyond the inner and outer ends thereof, the inner projecting ends of the inner adjacent spoke members lying in mutual contact, said ends being formed with recesses to form openings, stretcher-pieces for connecting and bracing the outer projecting ends of the adjacent spoke members, and a circumferential rim member resting upon and closing the projecting outer ends of the inner spokes, the said parts having their meeting edges brazed to bind them together.

RICHARD S. BRYANT.

In presence of—
A. L. PHELPS,
M. B. SCHLEY.